Nov. 3, 1931. E. V. HILL 1,830,273
TEMPERATURE CONTROL SYSTEM AND APPARATUS
Filed Nov. 11, 1930
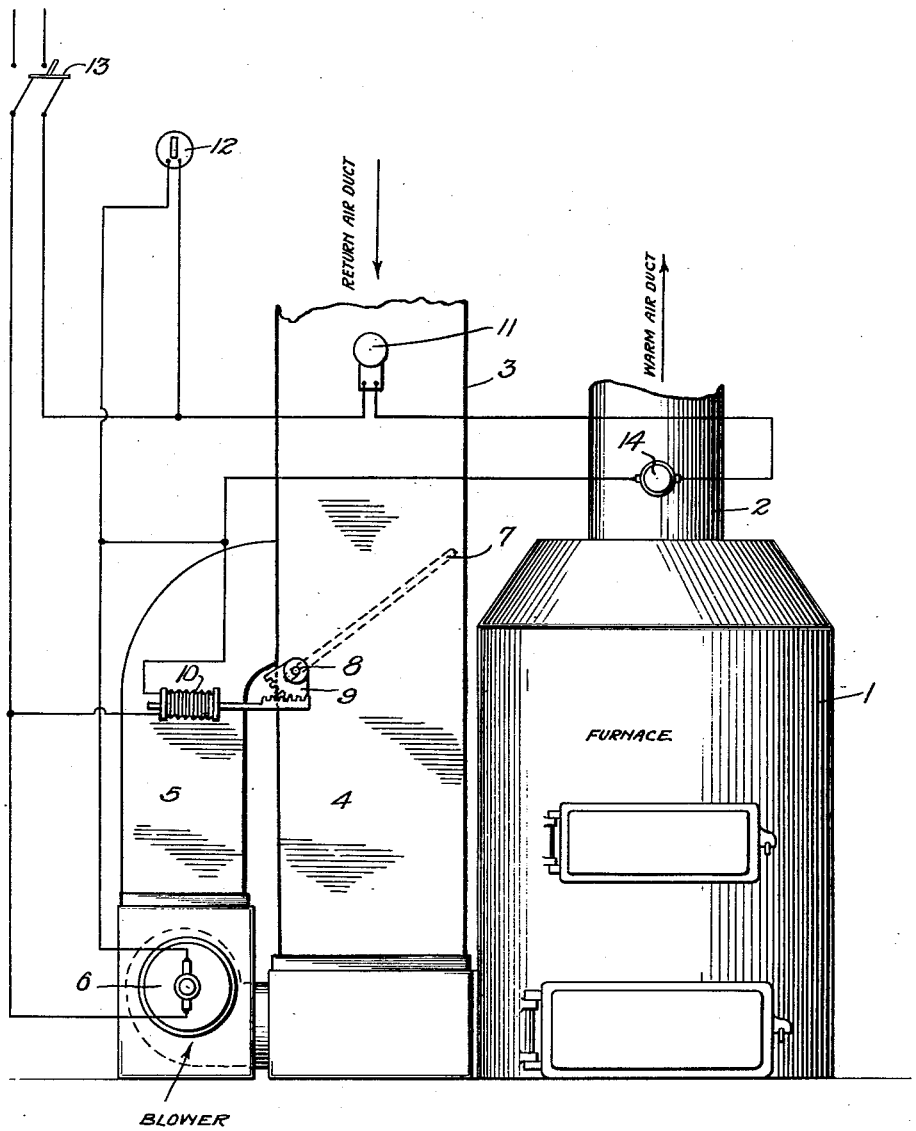
Inventor
Earl Vernon Hill.
By Albert Grobstein
Attorney Patented Nov. 3, 1931

1,830,273

UNITED STATES PATENT OFFICE

EARL VERNON HILL, OF CHICAGO, ILLINOIS

TEMPERATURE CONTROL SYSTEM AND APPARATUS

Application filed November 11, 1930. Serial No. 494,972.

This invention relates to a temperature control system to be used in conjunction with a hot air furnace, having associated therewith a fan or blower. More specifically, the invention is directed to the provision of thermostatic control means located within the warm air and return air ducts of a hot air heating unit having a blower associated therewith and blower duct and damper means, such heating unit being adapted for use in an air conditioning system or as a hot air furnace. Moreover, the invention relates to the provision of a thermostat in the cold air or return duct of a furnace. In warm weather when there is no fire in the furnace, the unit may be operated for circulating air in the building where it is installed, with or without humidifying means. That is, the fan or blower means associated with the unit may be used for air circuation.

In a system of air conditioning where a fan is employed to provide positive circulation, automatic control is important. Automatic control should be used from the standpoint of economy in operating the fan and it is also highly desirable for the purpose of maintaining a constant comfortable temperature in the building. There are certain features in the control of a system of this kind that must be given consideration. They are as follows:

1. The temperature of living rooms should be automatically controlled. This is desirable from the standpoint of health and comfort.

2. The fan should be shut off when the temperature has reached the degree of comfort. This not only prevents overheating but saves electric current.

3. The fan should automatically cease to operate when the fire dies down, thus preventing undue cooling and cold drafts.

The thermostatic control system of the present invention meets these three cardinal requirements and operates in a satisfactory manner when the fan is in service or when the system is operating by gravity. By throwing a switch the operating thermostats can be cut out and the fan used for air circulation when there is no fire in the furnace in warm weather. The system is simple and relatively inexpensive.

In the prior art it has been proposed to regulate the operation of a furnace or heating unit by thermostatic means, the thermostat being placed in a room or chamber an appreciable distance from the furnace so that at a predetermined temperature of the room in which the thermostat was located, the furnace temperature was either increased or decreased. This has not been satisfactory for various reasons, one of which is that the temperature of the air surrounding the spot where the thermostat was placed was not necessarily the average temperature of the room. For example, a thermostat placed near a window may register a temperature much different from that in another part of the room. Another reason is that the thermostat is a more or less inartistic and unsightly mechanical device in the esthetic surroundings of a living room. Finally, a large amount of electric wiring was required in such an arrangement.

It has also been proposed to place a thermostat in a hot air duct of a furnace with the object of regulating the operation of the same. However, neither of these proposals have been entirely satisfactory for the above reasons and for the additional reason that when the thermostat was placed in the room away from the furnace, overheating of the furnace was possible even though the room may have been below the desired temperature; when the thermostat was placed in the furnace hot air duct, it was possible for the room to overheat even though the furnace was below the predetermined temperature.

I have discovered that all of the above disadvantages may be obviated by placing thermostatic control means in both the warm air and return air ducts, together with attendant mechanism, all of which will be fully hereinafter explained.

I have found that by placing a thermostat in the cold or return air duct, accurate average temperature of the mixture of the air in the room is obtained and the unsightly thermostat together with less wiring placed with the other machinery in the basement. I have also discovered that by placing thermostats in both warm and cold air ducts, that overheating of the furnace is prevented as well as overheating of the room. While I have indicated a preferred wiring arrangement and embodiment of my invention in the accompanying drawing, it will be understood that the invention may be applied to other arrangements without departing from the scope and spirit thereof as pointed out in the present specification and claims.

Referring to the drawing, 1 indicates a furnace having a warm air duct 2, return air duct 3 with lower portion 4, and blower duct 5. Blower 6 is located in the blower duct and is adapted to operate in the usual manner. Situated in return air duct 3 and adapted to control passage of air thru both ducts 4 and 5, is the damper 7 pivoted at 8 and actuated by any suitable linkage 9 connected to damper control means 10. This damper motor is of the flexible bellows type containing an electric heating element and a volatile liquid. When the current is on, the heating element vaporizes the liquid and expands the bellows thus operating the damper by a link connection. Any suitable damper control means may be utilized.

The type of damper used will usually depend upon whether the return air duct is circular or square in cross-section. With a square cross-section, a single plate damper will be sufficient, while with a cylindrical return air duct, a double plate link damper may be used. Any suitable damper may be used, however, and in the preferred embodiment the damper is double-acting; that is, when the lower return air duct 4 is closed, the blower duct 5 is open, and vice versa.

In the warm air duct 2, located close to the furnace is the thermostat 14, while in the return air duct 3 is the thermostat 11. These thermostats are preferably of the mercoid type which can be set to throw on the current either when the temperature is increased or reduced.

The thermostats, damped motor and fan are connected in series as indicated in the drawing. The snap switch 12 and knife switch 13 complete the wiring arrangement.

The operation is as follows:

Thermostat 14 in the warm air duct is set at approximately 125° and is On when the temperature reaches this point or above. Thermostat 11 in the return air duct is set at 65° and is reverse acting, and is On when the temperature drops to 65° or below. During the heating season, the auxiliary snap switch 12 is open and the knife switch 13 connecting with the electric light circuit is closed. Current then may flow through the fan motor, damper motor, and both thermostats, provided the temperature in the warm and cold air ducts is at the correct point for fan operation. If the temperature in the warm air duct is below 125° (with a banked fire at night, for example) the circuit is broken, the return air duct damper closes the duct 5 and opens duct 4, the fan is not in operation, and the system operates by gravity. When the temperature in the warm air duct reaches 125°, the circuit is closed, the return air duct damper opens the blower duct 5 and closes duct 4, and the fan is in operation. The fan operation continues until the living rooms are at a comfortable temperature and until the temperature of the air in the return air duct 3 reaches 65°. This equals about 70° in the living rooms. When the temperature in the return air duct 3 reaches 65° the return air duct thermostat 11 breaks the circuit, the damper closes the blower duct 5 and opens duct 4, and the fan is shut off. The fan continues to be off until the temperature in the return air duct 3 drops below 65°, when the fan is again turned on.

When it is desired to operate the fan for air circulation purposes only, as in hot weather when the furnace is not fired, the snap switch 12 and knife switch 13 are both closed, thus completing the fan circuit.

My system and apparatus will maintain an even comfortable temperature in the living rooms. The temperature is controlled by the thermostat in the return air duct which gives a good average room temperature. The fan is off when the temperature is at a comfortable point, thus saving current. The fan is not on when the furnace fire is low, thus preventing drafts or cold air.

It will therefore be seen that I have provided a temperature control system and apparatus in combination with a fan furnace air-conditioning plant wherein the fan is shut off when the temperature is too high or too low. When the temperature of the return air is above 65° the fan stops; when the temperature in the warm air duct is 125° or below, the fan also stops, thus preventing cold drafty conditions caused by fan operation during the heating season. In other words the fan shuts off by the action of thermostatic control between two points, the high point when the room is warm enough and the low point when the heat from the furnace is insufficient.

I have indicated the preferred high and low temperatures but any predetermined temperatures may be used. While the blower duct 5 is advantageous in that it saves electric current, protects the furnace from overheating and permits better automatic temperature control, it is apparent that under certain conditions it may be dispensed with. In the event that the blower duct 5 is dispensed with, the fan may be placed in any location suitable for proper use. It will be apparent also, that in such a contingency, the arrangement of damper and damper control means can be omitted or revised. It is to be understood, however, that changes in the arrangement of accessories such as fan, dampers, and wiring circuit may be made without departing from the spirit and scope of my invention so long as their control is dependent upon the provision of a thermostat in or in connection with the return air duct of the system. I have not indicated any water supply or valve for the same in the drawing but any automatic water supply valve may be suitably connected with the system and other changes, such as hand damper control may be used without departing from my invention.

My apparatus and system thus provides an ideal control of temperature in heated rooms together with adequate ventilation without objectionable drafts of cold air.

Claims:

1. The combination with a hot-air furnace provided with a warm air duct and a return air duct, of a thermostat in the warm air duct, a thermostat in the return air duct, a blower duct connected with the return air duct, a motor operated fan in the blower duct, an electric wiring circuit including said thermostats and fan motor operable to shut off the fan motor when the temperature in the warm air duct falls below a predetermined point and the temperature in the return air duct rises above a predetermined point.

2. The combination with an air heating furnace provided with a warm air duct and a return air duct, thermostat means in the warm air duct, thermostat means in the return air duct, fan means associated with the return air duct, an electric wiring circuit including said thermostats and fan means operable to shut off the fan means when the temperature in the warm air duct falls below a predetermined point and the temperature in the return air duct rises above a predetermined point.

3. A temperature control system in combination with an air heating furnace provided with a warm air duct and a return air duct, comprising a blower duct associated with the return air duct, a fan in the blower duct, and damper means operable to close the inlet of the blower duct and cause the return air to pass directly to the furnace when the fan is not in operation.

4. A temperature control system in combination with an air heating furnace provided with a warm air duct and a return air duct, comprising a thermostat located in each duct, a blower duct adjoining the return air duct, a damper controlling the inlet of the blower duct, a motor operated fan in the blower duct, control means associated with the damper, an electric wiring circuit having said thermostats in series with the motor of said fan and with said control means.

5. The combination with an air heating furnace provided with a warm air duct and a return air duct, of thermostat means located in each duct, motor operated fan means associated with the return air duct, an electric wiring circuit including said thermostats and fan motor means in series connection with a source of power operable to automatically start and stop the fan when the respective thermostats reach predetermined temperatures.

6. The combination with an air heating furnace provided with a warm air duct and a return air duct, of a thermostat in the warm air duct, a thermostat in the return air duct, a blower duct adjoining the return air duct, a damper operable to open and close the inlet of said blower duct, electrical damper control means associated with said damper, an electric wiring circuit including each of said thermostats and said damper control means in series connected with a source of power operable to automatically open or close said damper when the respective thermostats reach predetermined temperatures.

7. A temperature control system in combination with an air heating furnace provided with a warm air duct and a return air duct, comprising thermostats located in said ducts, a blower duct connected with the return air duct, a damper for the blower duct, a motor operated fan in the blower duct, control means associated with the blower duct damper, a main electric wiring circuit including said thermostats connected in series with said fan motor and with said control means, and a shunt circuit associated with said main circuit including said fan motor and said control means connected in parallel operable to actuate said fan motor and control means independently of thermostats.

8. The combination with an air heating furnace provided with means to discharge warm air to the rooms and return cold air to the furnace, thermostatic means at the warm air outlet and thermostatic means at the cold air inlet, a motor operated fan for moving the air and an electric wiring circuit including said thermostats and fan and connected with a source of power operable to automatically start and stop the fan when the respective thermostats reach predetermined temperatures.

9. The combintion with an air heating furnace provided with a warm air duct and a return air duct, thermostat means in the warm air duct, thermostat means in the return air duct, fan means associated with the return air duct, an electric wiring circuit including said thermostats and fan means operable to start the fan means when the temperature in the warm air duct rises above a predetermined point and the temperature in the cold air duct falls below a predetermined point.

10. The combination with an air heating furnace provided with a warm air duct and a return air duct, of thermostat means located in each duct, motor operated fan means for circulating air through the furnace casing, an electric wiring circuit including said thermostats and fan motor means in series connection with a source of power operable to automatically start and stop the fan when the respective thermostats reach predetermined temperatures.

In testimony whereof, I hereunto set my hand.

EARL VERNON HILL.